Sept. 14, 1965 S. M. COX 3,206,590

APPARATUS FOR PRODUCING AN ELECTRICAL COMPONENT HAVING A CURRENT CONDUCTIVE PATH FORMED ON AN INSULATING SUBSTRATE

Filed Aug. 13, 1962 3 Sheets-Sheet 1

Inventor:
Shaun Maturin Cox
By: Baldwin & Wight
attorneys

Sept. 14, 1965 S. M. COX 3,206,590

APPARATUS FOR PRODUCING AN ELECTRICAL COMPONENT HAVING
A CURRENT CONDUCTIVE PATH FORMED ON
AN INSULATING SUBSTRATE

Filed Aug. 13, 1962 3 Sheets-Sheet 2

Inventor:
Sharon Maturin Cox
By: Baldwin + Wight
attorneys

Inventor:
Shaun Maturin Cox
By: Baldwin & Wight
Attorneys

United States Patent Office 3,206,590

Patented Sept. 14, 1965

3,206,590

APPARATUS FOR PRODUCING AN ELECTRICAL COMPONENT HAVING A CURRENT CONDUCTIVE PATH FORMED ON AN INSULATING SUBSTRATE

Shaun Maturin Cox, "Normanhurst," Westoe Village, South Shields, England

Filed Aug. 13, 1962, Ser. No. 216,656

Claims priority, application Great Britain, Aug. 11, 1961, 29,129/61

6 Claims. (Cl. 219—384)

This invention relates to electrical components of the kind in which at least one current path is provided by a film of a conductive nature (i.e., a film made with a conductive or semi-conductive material) on a supporting substrate of insulating material. The invention is applicable to various components, such as resistors (including heating elements), inductances or printed circuits. For example, it is known to provide a resistor with a film of tin and antimony oxides formed on a glass or other ceramic body by an iridizing process in which the heated ceramic body is exposed to a liquid spray or a vapour of salts of tin and antimony hydrolysable on the surface of the hot ceramic to form a hard and strongly adherent coating having suitable electrical characteristics. It is known practice to adjust the resistance created by such a film between spaced metallic terminals in contact therewith, by cutting through, e.g. by grinding away, parts of said film to constrain the current to pursue a tortuous path from one terminal to the other. Commonly the film is formed on the cylindrical surface of a solid rod or the exterior surface of a tube of ceramic material and the resistance is adjusted to the desired value by cutting a helical groove to leave the film in the form of a helical strip of which the length and width determine the resistance. Hereinafter components having a film of a conductive nature (conductive or semi-conductive material) will be referred to as "components of the kind described," and more particularly, resistors of cylindrical, tubular or other forms of film-coated substrate will be referred to as "resistors of the type stated."

My invention provides a method of production of an electrical component of the kind described, wherein a narrow zone or a plurality of narrow zones of the film are removed, so as to create at least one regulated conductive path between terminals, by means of electric sparking between the film and an electrode traversed in close proximity to the film.

The invention also provides apparatus for the production of an electrical component comprising means for holding a component having a film of a conductive nature disposed on an insulating substrate, means for holding an electrode in proximity to the said film, means for moving the electrode and the component relatively to each other so that the electrode traverses a predetermined path in close proximity to the film, and electrical connections to the said film and the electrode to enable sparking to be produced between the film and the electrode.

Referring for convenience of description to resistors of the type stated, the method and means of production afforded by the invention avoid disadvantages liable to occur when the film is grooved by being ground away or otherwise mechanically cut, whereby there is a tendency to initiate cracks or crevices in the groove which are liable to extend during use of the resistor either by delayed fracture or under thermal or mechanical stress, thereby affecting the electrical stability of the resistor. When the groove is in the form of a spiral or helix of fine pitch there is also a risk of a crack extending wholly across the conductive path, thus completely interrupting the continuity of an electrical circuit including the resistor. For this reason, since a ground or mechanically cut groove cannot ordinarily be formed with a width of less than 0.2 mm., it is usual to form a helical groove having a pitch of not more than 50 turns per linear inch, which limits the range of resistances capable of production thereby, it being well known that high resistance films are unstable in use so that comparatively coarse spirals requiring such high specific resistivity do not in general afford resistance of the desired stability. It is also usual to select a substrate with a thermal expansion coefficient closely matching that of the film, so as to minimise differential thermal stresses, and this in general necessitates a costly substrate. Further disadvantages of the ground or cut groove are the difficulty of providing a fine enough grinding or cutting tool to avoid wasteful use of the resistor surface area, so that in a commercial resistor having, for example, 20 turns per cm. of a groove about 0.2 mm. wide some 40% of the surface area is lost; and a rotary cutting or grinding operation is applicable only to resistors of simple form such as the peripheral surface of a cylindrical body, since a tool rotating at a high speed is not suitable for less simple forms, and it is, for example, difficult to describe meander patterns on flat surfaces.

The invention also contributes to the novel production of components of the kind described with a partly removed conductive film on the internal surface of a hollow body; and more particularly to the production of resistors of the type stated with a grooved film on the internal surface of a bore, which may be small, in a ceramic tube which has not hitherto been practicable.

According to another feature of the method, a zone whereat the conductive film is removed may be no more than about 0.03 mm. wide. The method has been evolved from the discovery that if an electric spark is allowed or caused to jump between a conductive probe and a conductive film, the film is removed at the polar point. When the method is carried out with current supply and operating means so controlled that the distance the spark will jump is limited, sparking will cease as soon as all conductive film within range of the probe is removed, but will be re-established by relative movement of the film and the probe to bring more of the film within range.

The means for carrying out the method may advantageously include provision for the maintenance of the desired spark gap. The sparking potential depends critically upon said spark gap, and since the width of the zone of film removed is also dependent on the length of the gap (such width being for example no greater than twice said length) the means employed is adapted to maintain a very small and constant gap. Maintenance of the most suitable spark gap may evidently be ensured by precise mechanical control of the probe, when the substrate has a precise geometrical form, that is, which conforms to its geometry within a tolerance comparable with the desired spark gap, which may be of the order of 0.01 to 0.1 mm.

When the geometrical form of the substarte is not precise (and also of course when it is) the means according to the invention may be adapted to maintain an accurate spark gap by mounting the probe to be resiliently displaceable in a direction normal to the film to be treated, and providing it with a protrusion of insulating material which bears against and slides freely over the film as the probe is constrained to follow the desired path. Thus the probe is spaced from the film at a distance determined by said protrusion, subject only to virtually negligible inexactitude of the film surface between the closely adjacent points where said protrusion bears on the film and where the spark occurs.

Preferably, however, the means according to the invention are adapted to maintain the spark gap by forming the probe as a blade having a portion capable of abutting the substrate where the film has already been removed by the sparking, the blade being formed to provide a gap between the edge and the film progressively decreasing towards the point of abutment and in the direction of the path to be described, and being sharp-edged or thin in the direction across said path. For example, for making a path in a film on the surface of a cylinder the probe may be a blade with a straight or curved edge such that as the film is rotated beneath it the gap between said edge and a point on the film moving towards the point of contact progressively decreases to a distance which the spark can jump. Such spark occurs before the point of abutment, so that the film is removed and the abutment takes place on the surface of the substrate in the bared path. Alternatively, for example, for making a path in a film on a flat surface or a concave surface such as the interior of a ceramic tube, the blade may have a convex curvature to achieve the same effect. For operating within the bore of the tube, even a very small bore, the probe may have the form of a resilient needle insertable longitudinally in the bore, and having a transversely extended quadrantal or other segmental blade one corner of which is caused to bear on the interior of the tube. Such a probe may be held non-rotatably, and may be axially immovable while the tube is rotated and longitudinally traversed, or the probe may be traversed within a rotating tube, or may be rotated and traversed within a stationary tube. The radius of curvature of the quadrantal blade should preferably be less than that of the bore, and a part of the blade which is trailing with respect to the direction of movement of the bore surface is urged into engagement with said surface so that a horn-shaped gap is provided between the edge of the blade and the approaching film, which gap progressively decreases until the spark can jump at a point immediately preceding the point of abutment. A probe as aforesaid can conveniently be made, for example, of nickel-chrome or platinum-rhodium wire one end of which is flattened, bent over and shaped to make the blade, and can be small and delicate since no appreciable mechanical force is required to operate it.

The method of the invention may include control of the voltage of the sparking current to a suitable value large enough to ensure complete or substantially complete local removal of the conductive film at the sparking point, but limited to prevent damage to the underlying substrate. The current supply may be alternating, but it is preferred to employ high frequency pulsating direct current, bursts of which may for example be controlled by resistance connected in series and capacitance connected across the current supply leads. With such pulsating direct current, the probe is preferably made to operate as the cathode, since although the film is removable in the desired path by a spark of either polarity, a cathodic probe is more satisfactory in that it leaves a clean groove uncontaminated with residue that would remain if the film were the cathode, and wear on such cathodic probe is negligible. The capacitance is preferably adjustable to be charged up to sparking potential at a rate controlled by the supply voltage and the series resistance, with a suitable frequency so that when the capacitor discharges to the film, the latter is removed within range of the spark, which will then cease, and the capacitor will be recharged before further film is brought within spark range by the relative displacement of film and probe. By appropriate selection of the supply voltage and series resistance high frequency pulsation may be attained, so that relatively high rates of relative displacement of the film and the probe are made possible. The capacitance and the sparking potential determine the amount of energy discharged by each spark.

In carrying out the method with a cathodic probe as described, the anodic connection to the film is preferably made so that the spark current does not traverse the resistor portion of the film already formed, but is forced to traverse the uninterrupted portion of the film over which the probe is still to operate, whereby the increasing resistance of the formed resistor portion is excluded from the spark-creating circuit and does not affect the characteristics thereof. Another circuit may be connected through the probe and said formed resistor portion or from the unformed resistor portion through the formed resistor portion for continuously metering the value of the resistance, said metering circuit including means for interrupting the spark current supply or withdrawing the probe to terminate removal of film thereby automatically when the resistance formed attains the required value.

A form of apparatus developed by me for carrying out the method of the present invention will be described with reference to the accompanying drawings wherein FIG. 1 is a plan view of the apparatus;

Figure 1:
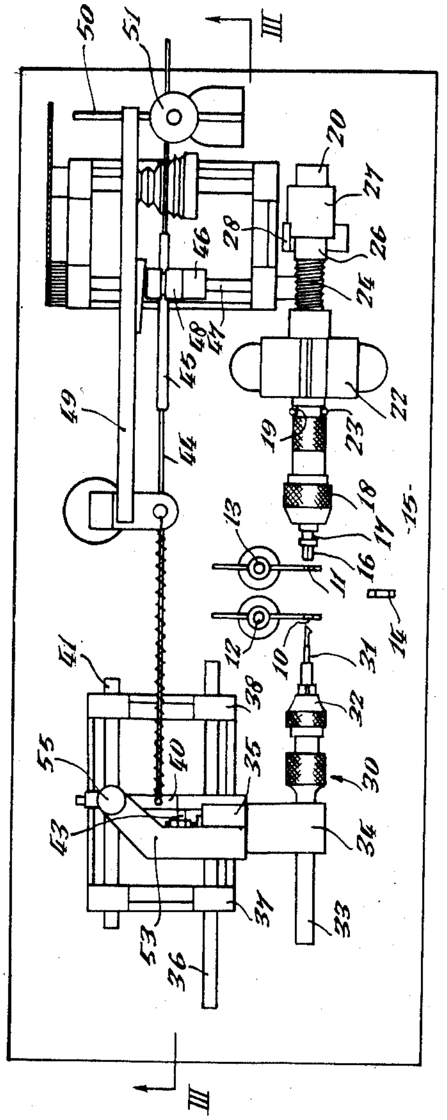

This apparatus is particularly designed for forming a spiral track or groove in a coating of a conductive nature lining the bore of a glass tube the internal diameter of which may be as small as about 0.1 inch. The internally coated tube is adapted to be located in two stationary V-members 10, 11 mounted on posts 12, 13, the tube being held against the V-members by a rod 14 hinged to the base 15 of the apparatus; when the tube is in position in the V-members, the rod 14 is pivoted into contact therewith and held in that position by a rubber band (not shown) extending between the end of the rod 14 and part of the base 15 of the apparatus.

The tube is rotated, when in the said position, by means of a head 16 which is made of spiralled copper wire and is slightly resilient, so as to enter the said bore and grip the tube at one end. The head is driven through a flexible drive 17 comprising a coiled wire surrounded by an insulating sheath itself held in the chuck 18 of a lathe headstock, generally designated by the reference numeral 19; within the chuck 18 and between the chuck and the head 16 discrete lengths of metal rod section may also be provided within the insulating sheath of the flexible drive 17 in order to give a positive drive.

The chuck 18 is held on a rotatable shaft 20 mounted in ball bearings 21 in a support 22. On the side of the support 22 nearer the chuck 18 the shaft 20 is driven by means of a driving belt 23 from a motor (not shown) below the level of the base 15, whilst on the other side of the support 22 the shaft 20 is threaded to form a worm 24 in mesh with a worm wheel 25 which takes off the drive to the feed for the tailstock carriage. Beyond the worm 24 the shaft forms an insulating section 26 and beyond this again is a brass contact sleeve 27 against which rests a resilient contact element 28 mounted through an insulating support 29 on the base 15. The flexible drive 17 extends the whole way back to the contact sleeve 27, to the interior of which it is connected electrically, thus giving electrical connection between the head 16 and contact element 28.

The tailstock (designated generally by the reference numeral 30) carries a probe 31 in a chuck 32 mounted on a shaft 33 anchored in a cylindrical insulating block 34. The insulating block 34 has one end of reduced diameter mounted within a brass block 35 rigidly secured to a rotatable rod 36 journalled in fixed end supports 37, 38. An insulated cable 39 leads axially through the block 34 and is electrically connected to the shaft 33, thus providing a path for electrical current to the probe 31.

On each side of the brass block 35 where it is attached to the rotatable rod 36 is a carriage frame member, each member having a hole through which passes the rod 36. One frame member 40 bridges the gap between the rotatable rod 36 and a fixed rod 41 secured at each end to the end supports 37, 38, the member 40 having a hole through which the rod 41 passes so that the tailstock carriage frame member 40 can be moved along the rods 36, 41 to feed the probe 31 towards the headstock 19. The other frame member (designated by the reference numeral 42) is fixed to the member 40 through a crosspiece 43.

The tailstock carriage is fed through a thin wire feed rod 44 attached at one end to the member 40 and sheathed at the other end in a rubber friction sleeve 45 which rests on a friction sleeve 46 on a shaft 47 fixed to the axis of the worm wheel 25. Pressing the sleeve 45 downwardly on the sleeve 46 is a grooved roller 48 which is spring-loaded downwardly for this purpose; this spring-loading is effected by journalling the roller 48 on a stub projecting from a cranked lever 49, pivoted at one end on a horizontal pivot 50 supported on a stand 51, the other end of the lever 49 being urged downwardly by a tension spring 52 between the lever and the base 15. It will be appreciated that rotation of the shaft 20 to rotate the chuck 18 and also the tube being grooved also causes feed of the tailstock carriage through the worm 24, worm wheel 25, worm wheel shaft 47, friction sleeves 46 and 45 and feed rod 44.

The assembly consisting of the probe 31, chuck 32, shaft 33, blocks 34, 35 and rod 36 can rotate round the axis of the rod 36. A lever 53 forming a rearward extension of the block 35 is offset to overlie the frame member 40 and is tapped at a position above this member to take an adjusting screw 54 which bears down on the member 40. The upper end of the adjusting screw 54 has a coiled wire handle 55 whilst the end of the lever 53 adjacent the screw 54 is biassed downwardly by a tension spring 56 between the lever 53 and the base 15. It is clear that by operating the handle 55 the probe 31 can be moved at right angles to its length round the axis of the rod 36.

Figure 2:
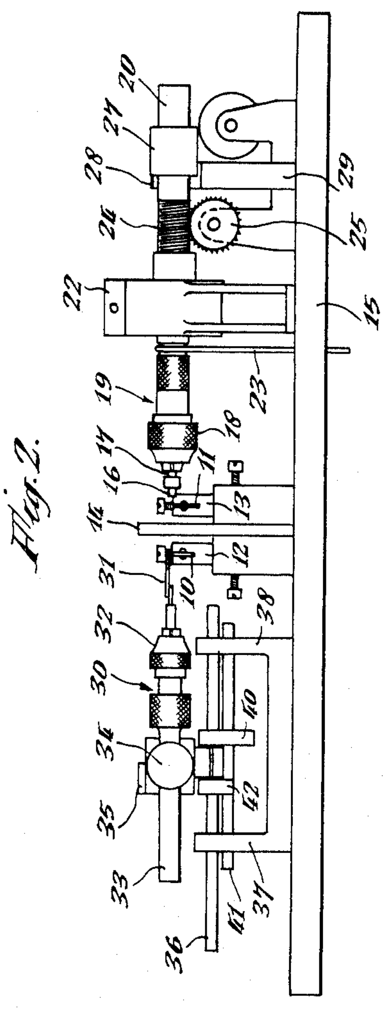
FIG. 2 is a front elevation thereof.
Figure 3:
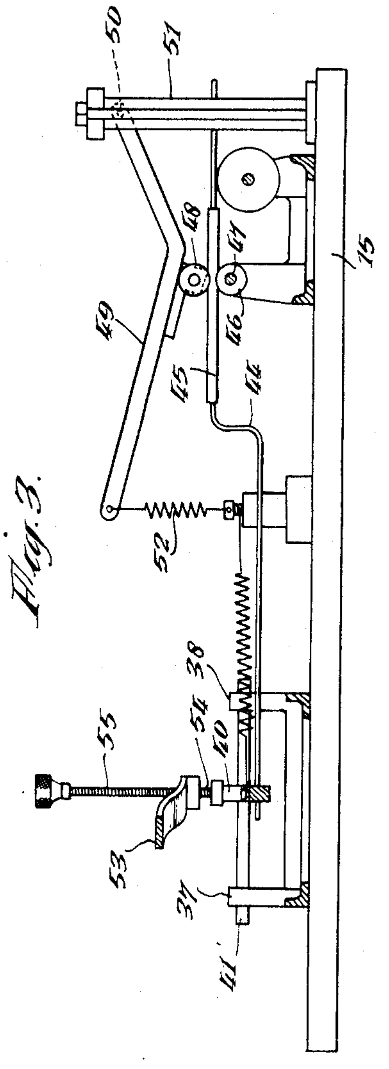
FIG. 3 is a view on the line III—III of FIG. 1.
Figure 4:
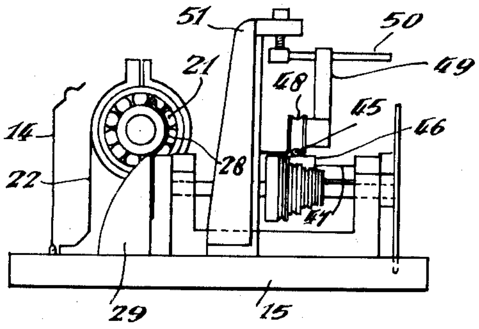
FIG. 4 is an end elevation from the right-hand side as seen in FIG. 1.
Figure 5:
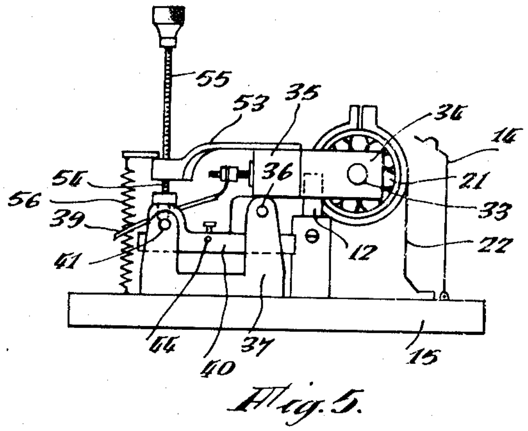
FIG. 5 is an end elevation from the left-hand side as seen in FIG. 1.
Figure 6:
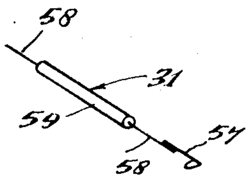
FIG. 6 is an enlarged view of the probe.

The probe 31 is shown in perspective in FIG. 6 which is drawn on a larger scale than FIGS. 1 to 3. The tip of the probe consists of a platinum-rhodium wire 57 which is flattened at the end, bent at right-angles and trimmed as necessary to form a thin segmental blade lying at right angles to the remainder of the wire 57. This wire is welded at the end remote from the blade to a conducting support wire 58 which is sheathed in an insulator 59 leaving a piece of bare wire to be held in the chuck 32.

To operate the apparatus a tube of insulating material lined with conductive oxide or other suitable conductive material is mounted on the V-members 10 and 11 and pushed on the head 16, being held in position by the rod 14 in the manner already described, and the probe 31 is inserted into the tube. A source of direct current is connected to the probe and to the head 16 which is in contact with the conductive lining of the tube.

The motor operating the shaft 20 through the driving belt 23 is started and the handle 55 turned until a spark forms at the blade at the end of the probe 31 (this can be observed through the tube wall if this is of glass). A further slight movement of the handle 55 brings the end of the blade against the surface of the substrate of the tube where the conductive lining has been removed by the spark, and the pulses of direct current provided by the electrical circuit (which will be described below) cause sparking to continue at a part of the blade slightly away from its point of contact with the substrate. The blade is held in position against the substrate by the resilience of the wire forming the probe. The effect of this, if the parameters are correctly chosen, is the even removal of a helical path of conductive material as the tube is rotated by the chuck 18 and the probe 31 is fed forward in the tube. It will be appreciated that the insulating sheath 59 is for the purpose of preventing contact of the metal in the probe 31 with the inner surface of the tube, except for the blade at the end of the probe.

Figure 7:
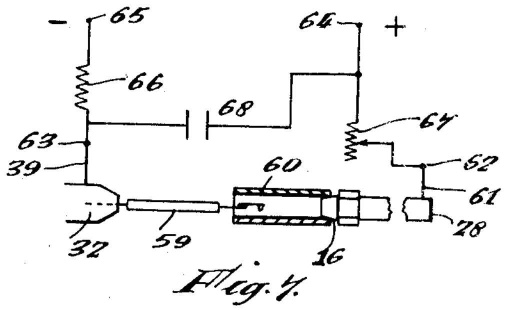
FIG. 7 shows the electrical circuit.

The electrical circuit is shown diagrammatically in FIG. 7 where a lined tube being operated on is represented by the numeral 60. The head 16, as already explained, is electrically connected to the contact element 28 and this is connected through a wire 61 to a suitable terminal 62. Likewise the chuck 32 is connected electrically to the cable 39 which is connected to another terminal 63. Terminal 63 is connected through a primary resistance 66 to another terminal 65, whilst terminal 62 is connected through a variable secondary resistance 67 to another terminal 64, whilst a capacitor 68 is connected between terminals 63 and 64. A suitable source of direct current is connected across terminals 64, 65, preferably with the polarity shown in FIG. 7 so that the probe is connected to the negative terminal. Any suitable source of direct current may be employed, such as the smoothed and rectified output from a main transformer.

It will be realised that there are then four adjustable parameters viz. the voltage, and the values of the primary resistance 66, the capacitor 68 and the secondary resistance 67 which require to be of suitable value if a track of desired form is to be generated with a given probe traversing mechanism and conductive film. Generally speaking the behaviour of each arrangement may be described as belonging to one of the following categories:

(1) A current may flow across the gap without any noticeable tracking occurring.

(2) Intermittent track-making may occur in which isolated marks are separated by undamaged film.

(3) A continuous track is generated which is defined by the geometry of the probe in proximity to the film.

(4) A continuous track with deeply serrated edges is generated with considerable damage to the substrate.

The third category which is clearly the one which it is wished to produce consistently is further characterized in that across the track width a series of microscopic marks on the track may appear as if made by overlapping circles each centred on the centre line of the track.

A large number of tests in which the effect of variations in these parameters have been studied has resulted in the following generalizations. A voltage difference of at least 16 volts (about 30 or 40 volts is preferred) must generally exist across the gap if sparking is to occur. If the applied voltage is insufficient or if for example the pressure of the probe on the film is too great so that a large current flows in the secondary resistance 67 and the voltage drop across this resistance causes the voltage across the gap to be reduced below 16 volts, then no tracking or intermittent marking only occurs—i.e. category 1 or 2. If the voltage is too large, the secondary resistance low and the capacity large, then a track of the fourth category is generated.

At intermediate voltages where the sought for category 3 tracks are expected, the nature of the track appears to depend on the energy discharged in each spark and the frequency of sparks which may either be determined by the RC time constant of the circuit or the velocity of traverse of the probe and the voltage across the gap. Thus the spark may stop because the capacitor is sufficiently discharged to lower the voltage across the gap below that at which the spark can be maintained or the damage to the film may be such that the gap is increased until the voltage is insufficient to bridge it. The first condition gives a track well defined by the geometry of the probe but the destruction of the film is less complete than in the second case. The most satisfactory operating conditions appear to correspond to approximately equal chances of spark termination by the two mechanisms.

In practice it is found that a wide range of resistive films ranging from 20 to 1000 ohms per square can be successfully spiralled with a fixed set of parameters thus:

| | |
|---|---|
| Velocity of probe along the track | 1 cm. per sec. |
| Value of primary resistance 66 | 5,000 ohms. |
| Applied Voltage | 40 volts D.C. |
| Capacity of capacitor 68 | $2\mu$ F. |
| Value of secondary resistance 67 | 500 ohms. |

The value of the secondary resistance can with advantage be arranged to increase as the spiral progresses thus compensating for the diminishing resistance of the unspiralled portion of the film with consequent improvement in uniformity of track.

150 resistor blanks (each comprising a glass tube of about 0.1 inch diameter bore coated internally with an oxidised deposit containing tin and antimony oxides in the proportion of approximately 95% Sn to 5% Sb) were spiralled to values ranging from 1,000 ohms to 1 megohm using a platinum-rhodium tipped probe 31 and the above conditions. The only maintenance required was the occasional removal of dust which tends to collect at the probe tip. Only seven resistors were rejected for unsatisfactory spiralling, due in each case to eccentricity of tubing which the probe was unable to follow.

A wide variety of probe materials has been tried without demonstrating any marked differences in performance. However, the platinum-rhodium tipped probe referred to above appears to have an indefinite life. It has given consistent performance over a period of a year.

The process has been satisfactorily operated in a liquid medium either by immersing the probe and film in the liquid or simply wetting the conductive film with the liquid and applying the probe to the wet surface. No advantage sufficient to outweight the trouble of cleaning off the liquid was found in those cases where the film was laid down on a smooth glass like surface. However where the film was on a matt substrate some advantage accrued. Thus attempts to spiral a nickel-chromium evaporated film on an unglazed porcelain rod proved uncertain in operation. However on wetting the surface with paraffin oil and increasing the voltage to 60 volts a satisfactory spiral was produced.

The apparatus particularly described with reference to the drawings may equally well be utilised with the minimum of adjustment for resistors having a cylindrical substrate externally coated with conductive or semi-conductive material. The apparatus is however particularly valuable for internally coated tubes which, especially if they are of small bore, are difficult or impossible to track by any other method.

The invention may also be applied, as already indicated, to other forms of electrical components such as inductances or printed circuits, whether on a cylindrical or a flat or other substrate.

Thus, as a further illustration of the practice of the invention it is known to produce heated transparencies in aircraft to prevent condensation of such surfaces by applying thereto transparent films of conducting materials and passing electric current through them thus generating heat. The aerodynamic requirements often call for shapes of such transparencies which make it difficult to provide uniformity of electric heating without a multiplicity of metallic bus-bars which themselves obscure the transparency. The exercise of this invention removes this difficulty in that it is possible to scribe an insulating track which is of such slender width and depth as to be practically invisible. The area to be heated can therefore be sub-divided at will and thus the electric current constrained to follow any chosen path. In the practice of the invention the probe connected to its associated electric circuit is mounted as a scribe in a pantograph the anode being connected to the conductive film preferably near the terminal point of the track to be formed and the required track described by the pantograph.

What I claim and desire to secure by Letters Patent is:

1. Apparatus for the production of an electrical component comprising means for rotatably mounting a blank, said blank comprising an insulating substrate coated with a film of a conductive nature, an electrode including a blade, resilient means for mechanically biassing said electrode toward the blank, a first part of the blade thereby engaging the blank while a second part of the blade is slightly spaced from the surface of the blank to form a spark gap therebetween, means for providing relative movement between the electrode and the blank so that said first part of the blade trails behind the second part thereof, and electrical supply means connected between the film and the electrode for producing sparking at said spark gap which progressively removes predetermined portions of said film in the vicinity of said blade from the blank, said first part of the blade resting directly upon the insulating substrate where the film has been removed.

2. Apparatus for the production of an electrical component comprising means for holding a component including a tube of insulating material forming a substrate, said tube having a film of a conductive nature coating the interior cylindrical surface thereof, a probe, a blade-shaped electrode at the end of the probe, the blade being in a plane substantially at right angles to the probe, means for holding the probe in substantially axial alignment with the tube with the electrode within the tube, means for biassing said electrode against the component so that a part of the blade contacts the component while another part of the blade is adjacent the surface thereof, means for providing relative movement between the electrode and the component so that the part of the blade contacting the component trails behind said other part of the blade, and electrical supply means connected to the film and to the electrode to enable sparking to be produced between said other part of the blade and the film, thereby removing portions of the film from the blank in the vicinity of said blade.

3. Apparatus according to claim 2 wherein said probe comprises a wire flattened at its end and bent at right angles to form a blade constituting the electrode.

4. Apparatus according to claim 2 wherein said probe comprises a wire and the electrode is biased against the component by the resilience of the wire forming the probe.

5. Apparatus according to claim 2 wherein said electrical supply means comprises a source of direct current a resistance and a capacitor connected in series with said direct current source, and means for connecting said capacitor in parallel with the spark gap located between said other part of the blade and the film.

6. Apparatus for the production of an electrical component including means for holding a component comprising a tube of insulating material forming a substrate, on the interior cylindrical surface of which is coated a film of a conductive nature, a probe comprising a resilient wire having a blade-shaped electrode located thereon in a plane substantially at right angles to the wire, means for holding the probe in substantially axial alignment with the tube with the electrode within the tube, means for moving the probe transversely to its length to urge the electrode against the inner surface of the tube so that a part of the blade contacts the component while another part of the blade is adjacent the surface thereof, means for traversing the probe along the tube, means for rotating the component so that the surface thereof passes under said other part of the blade towards the part of the blade which contacts the component, and electrical supply means connected to the film and to the electrode for producing sparking between said other part of the blade and the film, thereby removing portions of the film from the blank in the vicinity of said blade.

References Cited by the Examiner

UNITED STATES PATENTS

| | | | |
|---|---|---|---|
| 1,909,079 | 5/33 | Steerup | 117—200 |
| 2,248,057 | 7/41 | Bond | 219—383 |
| 2,503,418 | 4/50 | Scrantom | 338—300 |
| 2,635,162 | 4/53 | Kohring | 338—300 X |
| 2,680,184 | 6/54 | Cox | 219—68 |
| 2,974,215 | 3/61 | Inoue | 219—68 |
| 3,015,014 | 12/61 | Gartner et al. | 219—68 |
| 3,106,502 | 10/63 | Starger et al. | 219—383 X |
| 3,119,919 | 1/64 | Pratt | 219—384 |

RICHARD M. WOOD, *Primary Examiner.*